(No Model.)

J. W. L. SIMMONS.
PROPELLER WHEEL.

No. 335,640. Patented Feb. 9, 1886.

WITNESSES:
Wilson Ringle
Bent. H. Boyden

INVENTOR:
James W. L. Simmons.
By G. A. Boyden

UNITED STATES PATENT OFFICE.

JAMES W. L. SIMMONS, OF BALTIMORE, MARYLAND.

PROPELLER-WHEEL.

SPECIFICATION forming part of Letters Patent No. 335,640, dated February 9, 1886.

Application filed June 11, 1885. Serial No. 168,302. (No model.)

*To all whom it may concern:*

Be it known that I, JAMES W. L. SIMMONS, a citizen of the United States, residing at Baltimore, in the State of Maryland, have invented certain new and useful Improvements in Propeller-Wheels, of which the following is a specification, reference being had therein to the accompanying drawings.

My invention relates to improvements in propeller-wheels for steamboats, &c.; and it consists in having the wings thereof made separate and secured together by means as illustrated in the accompanying drawings, in which—

Figure 1:
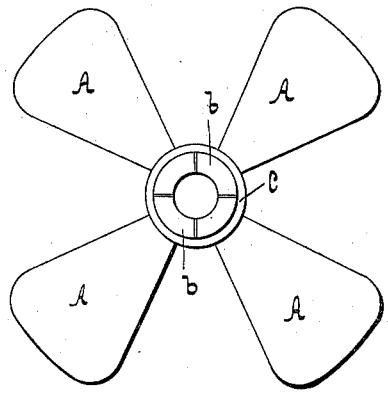
Figure 2:
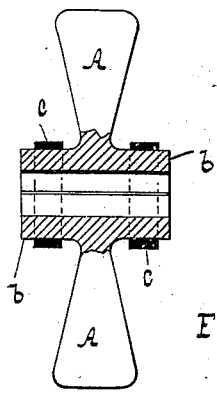
Figure 3:
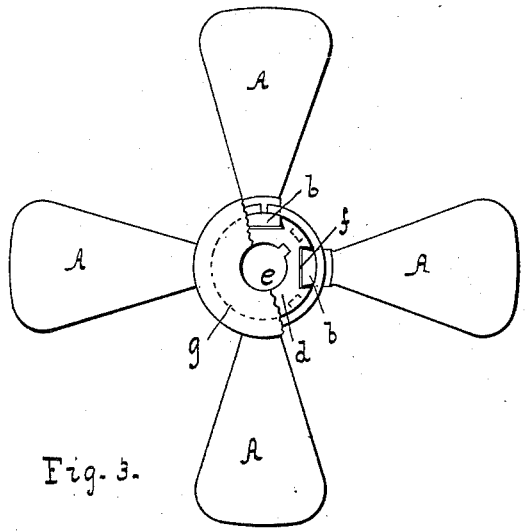
Figure 4:
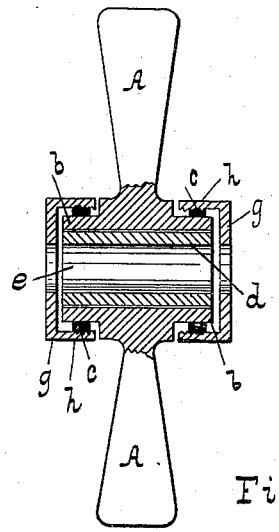
Figure 5:
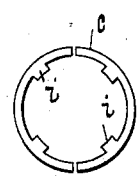
Figure 6:
Figure 7:
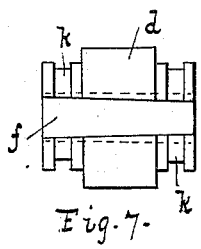
Figure 8:
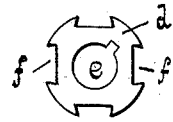

Figures 1 and 3 are front views of the wheel; Figs. 2 and 4, diametrical sectional views; Fig. 5, a front view of the separable clamping-ring; Fig. 6, a side view of same; Fig. 7, a side view of the hub, and Fig. 8 an end view of the same.

Similar letters refer to similar parts throughout the several views.

The letter A designates the wings of the wheel, which are provided with base-pieces $b$, that project outward from either side of the wings, over which are placed the rings $c$, by which they are held together. As shown in Figs. 1 and 2, the base-pieces $b$ are shaped when put together to form the hub, and securely held together by shrinking or swaging on the rings $c$. As shown in Figs. 3 and 4, the wings are secured to the hub $d$, which is provided with the central hole, $e$, through which the shaft passes, and tapered longitudinal dovetail slots or grooves $f$, in which are fitted and placed the bases $b$ of the wings, and held therein by the separable rings $c$ and the caps $g$, which have the inside of the overlapping flanges $h$ threaded, by which they are screwed on the separable rings $c$, and they being provided with the projections $i$, which fit in the annular grooves $k$, prevent the rings and the caps screwed thereon from slipping off the hub, and the rings $c$ being separable permit them to be placed around the same, and also when the caps $g$ are screwed thereon draw them together, by which they are brought to bear on the bases $b$ of the wings A, thereby firmly seating and securely holding the wings to the hub.

By the construction herein described and shown either or all the wings may be quickly placed or removed, which is very desirable in case one of the wings should get broken, as the parts are all interchangeable, thus producing a propeller-wheel which may have its parts replaced without the necessity of special fitting.

Having described my invention, what I claim, and wish to secure by United States Letters Patent, is—

1. In a propeller-wheel, the combination of the hub $d$, provided with the longitudinal slots $f$, in which are placed the wing-bases, and the annular grooves $k$, in which the projections $i$ of the rings $c$ fit, the wings A, provided with bases corresponding to the slots $f$ in the hub, the rings $c$, made in two parts, by which they press and firmly hold the wing-bases to the hub when the caps $g$ are screwed on, and the caps $g$, provided with threads, by which they screw on the rings $c$, whereby the several parts are held together, and by which the wheel may be quickly taken apart and parts replaced, when desired, as herein specified.

2. In a propeller-wheel, the wings A, provided with projecting base-plates, the hub $d$, provided with the slots $f$, in which the wing-bases fit, and the caps $g$, provided with threads and arranged to be screwed over the projections of the base-plates, whereby the wings and hub are securely held together when the caps are screwed on, and the same qnckly and conveniently taken apart by unscrewing the caps, as herein specified.

In testimony whereof I affix my signature in presence of two witnesses.

JAMES W. L. SIMMONS.

Witnesses:
JNO. T. MADDOX,
G. A. BOYDEN.